Nov. 23, 1965 R. C. FINVOLD 3,219,975

PROPORTIONAL REMOTE RADIO CONTROL SYSTEM

Filed Dec. 7, 1962 2 Sheets-Sheet 1

INVENTOR.
RODGER C. FINVOLD
BY
Knox & Knox

PROPORTIONAL REMOTE RADIO CONTROL SYSTEM

Filed Dec. 7, 1962

2 Sheets-Sheet 2

INVENTOR.
RODGER C. FINVOLD
BY
Knox & Knox

United States Patent Office 3,219,975
Patented Nov. 23, 1965

3,219,975
PROPORTIONAL REMOTE RADIO CONTROL SYSTEM

Rodger C. Finvold, San Diego, Calif., assignor to The Ryan Aeronautical Co., San Diego, Calif.
Filed Dec. 7, 1962, Ser. No. 243,118
4 Claims. (Cl. 340—171)

This invention relates generally to remote radio control systems and specifically to a system for radio control of aircraft and other vehicles.

*Background*

Various types of remote radio control systems, some simple, others complex, are known to the art. All such systems transmit and receive signals for control of electrical components such as relays and motors which, in turn, usually control other devices. Some systems transmit a simple, pulsed C.W. signal; others, a modulated carrier wave; and still others, one or more carrier waves with simple or complex modulation. All radio control systems are vulnerable to interference from signals originated by other systems.

In general, control signals are of two types: one being a simple command signal that turns a device on or off; the other being a signal with a frequency, phase, or amplitude characteristic that causes a device to respond to the characteristic. The characteristic may be fixed or changing, and the response may be abrupt, in steps, or proportional to the duration, amplitude, or changing characteristic of the control signal.

In a system for remote radio control of aircraft, it is desirable for the aircraft control surfaces, rudder, ailerons, and elevator, to respond to the control signals in the same manner as they respond to the pilot's movement of the rudder controls and control stick. This kind of radio control is called proportional control. Also, since reception of an interfering signal could throw the aircraft completely out of control, any radio system for remote control of aircraft should include adequate safeguards against radio interference.

Accordingly, this invention is a remote radio control system that provides proportional control of associated servomotors by proper selection of phase and amplitude of voltages applied to the servomotors, and guards against radio interference by transmitting a double-modulated carrier wave, requiring reception of two double-modulated signals, one for reference, the other for control, for servomotor operation. The system also provides variable phase and simple, on-off types of control signals for control of devices other than servomotors.

*Objects*

It is a principal object of this invention to provide a remote radio control system in which the response of the control devices is proportional to the phase and amplitude of the control signals.

It is another object of this invention to provide a proportional remote radio control system that includes reasonably secure safeguards against radio interference.

It is still another object of this invention to provide a remote radio control system that includes proportional, variable phase, and simple on-off types of control signals.

*Drawings*

The attainment of these objects and others will be realized from the following specification, taken in conjunction with the drawings, in which.

Figure 1:
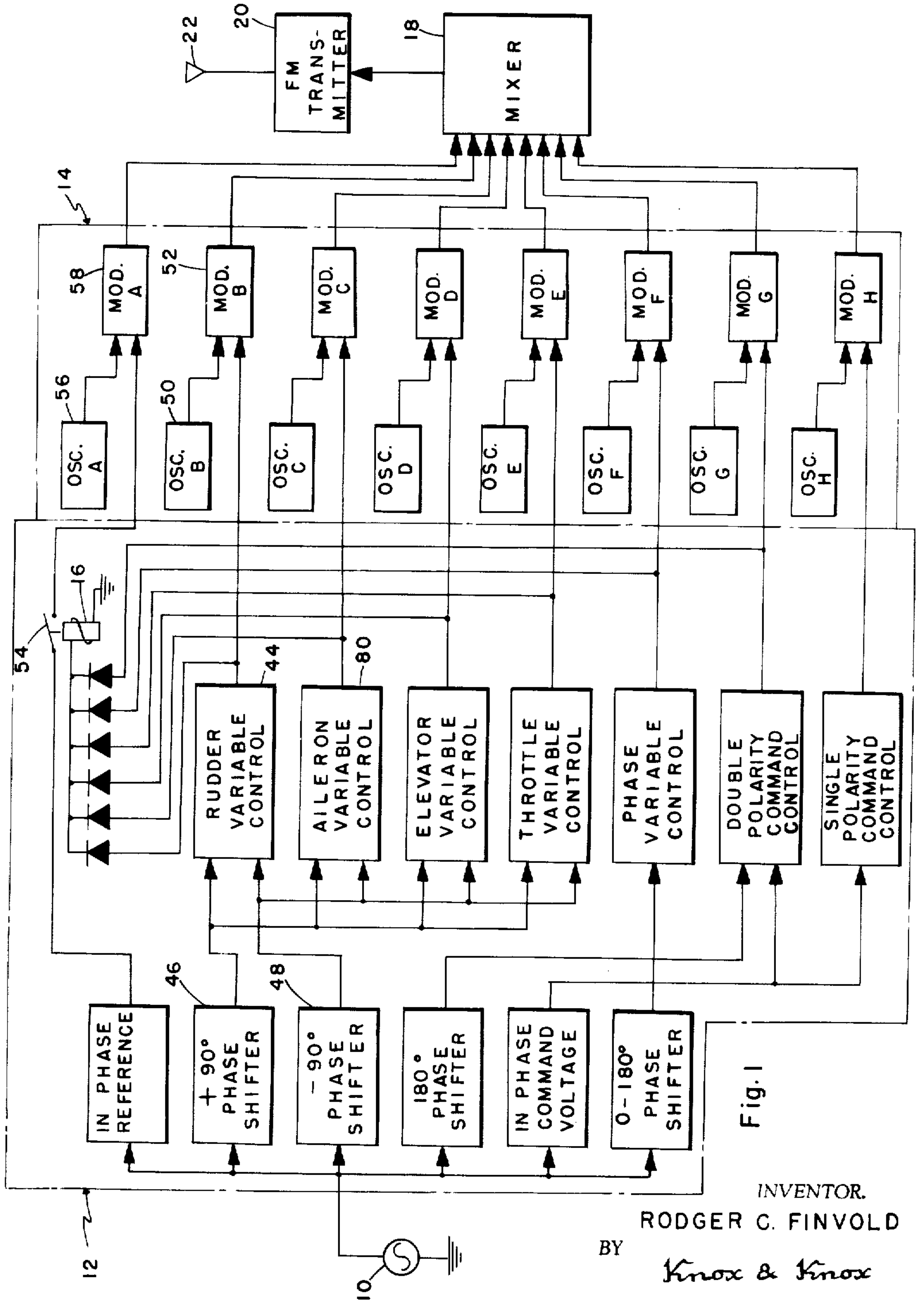
FIGURE 1 is a functional block diagram of the controller and transmitter.

In FIGURE 1, A.C. frequency source 10 generates a frequency, such as 400 c.p.s., that ultimately is used for control of servomotors and other devices. The output of A.C. frequency source 10 is fed to controller 12, where it is used as a fixed reference voltage and a fixed or variable control voltage. Controller 12 contains circuitry and components for shifting the phase of the A.C. frequency and feeding a fixed or variable voltage of appropriate phase and selectively of variable phase to modulator 14. Controller 12 originates a fixed reference voltage and four types of control voltage: servomotor control, variable phase control, double polarity control, and single polarity control. The reference voltage is used in conjunction with the servomotor, variable phase and double polarity types of control voltages. The servomotor control voltages lead or lag the reference voltage by 90 degrees for positive or negative rotation of servomotors. The variable phase control voltages vary in phase from zero to 180 degrees relative to the reference voltage. The double-polarity control voltages are either in phase or 180 degrees out of phase with the reference voltage. The single-polarity control voltages are applied independently of the reference voltage. The servomotor control voltages control servomotors that, in turn, control the movement of such devices as rudder, ailerons, elevators, throttle, flaps, bomb bay doors, landing gear, and the like. The variable phase control voltages may be used to produce a variable amplitude signal at the output of a phase detector or ring demodulator by a method wherein the phase of the modulation signal is varied from zero for maximum signal at one extreme through a null at 90 degrees to 180 degrees for maximum signal at the other extreme. Double and single-polarity control voltages control other types of devices such as lights, bombs, parachutes, flares, cameras, fuel jettisoning, destruction mechanisms, and so on. Double polarity control voltages may be used for trimming auxiliary equipment around a nominal null point, such as a critical transmitter frequency. Whichever type of control voltage is selected, the output of controller 12 is fed to modulator 14; and relay 16 insures that the reference voltage and servomotor, variable phase or double-command types of control voltages are fed to modulator 14 at the same time.

Modulator 14 contains an audio oscillator and associated modulator for the reference voltage and a separate oscillator and associated modulator for each control voltage. Each audio oscillator generates a different frequency signal in the 2–80 kc.s. range. The audio frequency signal generated by each audio oscillator is modulated by the A.C. voltage used as a reference voltage or selected by controller 12 as the control voltage. Amplitude, frequency and phase modulation are used in different embodiments. The output of each modulator is fed to mixer 18, and from there to transmitter 20.

Transmitter 20 generates a carrier wave in the UHF range of frequencies, although other parts of the radio frequency spectrum may be used. The carrier wave is frequency modulated by the output of mixer 18; then amplified and radiated into space by antenna 22. Antenna 22 may be directional or non-directional, and the carrier wave may be amplitude or phase modulated.

Figure 2:
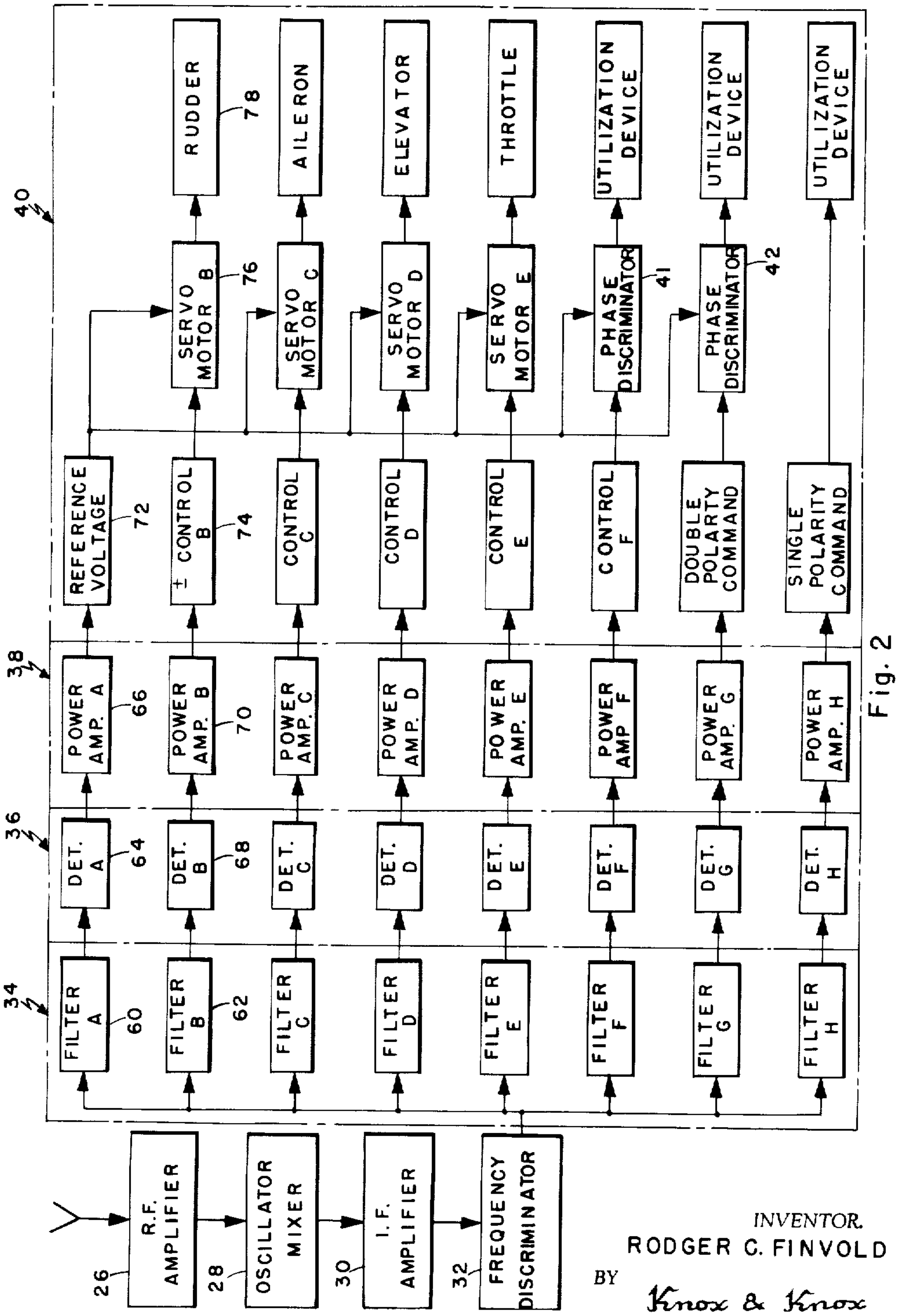
FIGURE 2 is a functional block diagram of the receiver and control devices.

Referring to FIGURE 2, the double-modulated carrier wave is received by an antenna, amplified by radio frequency amplifier 26, converted to a lower intermediate frequency by oscillator mixer 28, and amplified by intermediate frequency amplifier 30. In frequency discriminator 32, the amplitude, frequency, or phase modulated audio frequency signals are separated from the frequency modulated carrier wave and passed to filter section 34.

Filter section 34 contains a separate filter for each audio frequency signal used to frequency modulate the carrier wave. The output of each filter is fed to a separate amplitude, frequency, or phase modulation detector in detector section 36. Each detector separates the A.C. voltage from the audio frequency signal, and feeds the A.C. voltage to a separate power amplifier section 38. The reference voltage and the control voltage, then, are fed to control devices section 40.

In control devices section 40, the reference voltage is applied to all servomotors and to phase discriminators 41 and 42. Servomotor control voltages that lead or lag the reference voltage by 90 degrees are fed to servomotors. Variable phase control voltages that vary from zero to 180 degrees out of phase with the reference voltage are fed to phase discriminator 41 and from there to control devices. Double-polarity control voltages that are in phase or 180 degrees out of phase with the reference voltage are fed to phase discriminator 42, and from there to control devices. And single-polarity control voltages are fed to control devices independently of the reference voltage. The servomotors move rudder, ailerons, elevator, throttle, and other utilitarian devices in positive or negative directions. Other utilization devices both on-off and proportional, are controlled by the variable and fixed double polarity and the single polarity control voltages.

Tracing a single A.C. control voltage and the A.C. reference voltage from controller 12 in FIGURE 1 to control devices section 40 in FIGURE 2, rudder variable control 44 is used to originate a control voltage that leads the reference voltage by 90 degrees. The amplitude of the control voltage and ultimate angular displacement of the rudder is determined by the setting of rudder variable control 44, which may be a potentiometer with one half-section connected across the output of phase shifter 46 and the other half-section connected across the output of phase shifter 48. The output of rudder variable control 44 energizes relay 16, insuring that the reference voltage also is applied at the same time, and amplitude, frequency, or phase modulates the output of audio oscillator 50 in modulator 52. When relay 16 is energized, normally open contacts 54 close and apply a fixed reference voltage that amplitude, frequency, or phase modulates the output of oscillator 56 in modulator 58. The output of modulators 52 and 58, then are fed to mixer 18 and used to frequency modulate the carrier wave generated by transmitter 20. The double-modulated carrier wave containing the reference voltage and the rudder control voltage in two separate audio channels, then is radiated into space by antenna 22 and received by an antenna.

In the receiver, frequency discriminator 32 eliminates the carrier wave and passes the two amplitude, frequency, or phase modulated audio frequency signals to filter section 34. Here filter 60 accepts the audio frequency signal containing the reference voltage modulation and filter 62 accepts the audio frequency signal containing the rudder control voltage modulation.

Detector 64 eliminates the audio frequency signal and passes the reference voltage to amplifier 66, while detector 68 eliminates the audio frequency signal and passes the rudder control voltage to amplifier 70. Both the reference voltage and the rudder control voltage, then are fed through reference voltage 72 and plus or minus control 74 to servomotor 76. Rudder 78, then moves in response to the servomotor rotation; say, in a positive direction.

In practice, the rudder variable control 44 may be connected mechanically with aileron variable control 80 for coordinated movement of ailerons and rudder during turns. In this case, the reference voltage and two servomotor control voltages are transmitted simultaneously. Also, variable phase, double-polarity and single-polarity control voltages may be transmitted at the same time as servomotor control voltages.

It is understood that minor variation from the form of the invention disclosed herein may be made without departure from the spirit and scope of the invention, and that the specification and drawing are to be considered as merely illustrative rather than limiting.

I claim:

1. A proportional radio control system for selectively actuating any one of a plurality of control devices by the conjoint action of at least two signals, comprising:
- transmitter means for generating a radio frequency carrier;
- a plurality of tone generators providing different audio frequency signals;
- a source of common reference signal of fixed frequency;
- a plurality of control means;
- phase shifting means connected between said reference signal source and each of said control means and providing control signals of identical frequency to said reference signal but in different phase relationships thereto;
- modulating means coupled each to one of said control means and one of said tone generators and to said reference signal source;
- further modulating means connected to one of said tone generators and to said reference signal source;
- all of said modulating means being connected to said transmitting means to modulate the carrier with the respective composite signals;
- a receiver to receive the modulated carrier;
- a plurality of control devices responsive to the frequency of said reference signal;
- said receiver having means to separate said reference signal and apply the same to each of said control devices;
- and means in said receiver to separate the individual control signals and apply each control signal to one of said control devices.

2. The combination of claim 1, wherein certain of said control means vary the amplitude of the control signals and others vary the phase thereof.

3. The combination of claim 1, wherein the phase relationships of said phase shifting means include in phase, plus 90 degrees, minus 90 degrees, 180 degrees out of phase and variable phase, with respect to said reference signal source.

4. The combination of claim 1 and including switch means connected between said reference signal source and its associated modulating means;
- said switch means being operable by said control means to couple said reference signal source to the transmitter only when a control means is actuated.

References Cited by the Examiner

UNITED STATES PATENTS

| | | | |
|---|---|---|---|
| 2,616,031 | 10/1952 | Nosker | 343—225 X |
| 2,699,301 | 1/1955 | Clute | 343—225 X |
| 2,705,321 | 3/1955 | Beck et al. | 343—225 X |

NEIL C. READ, *Primary Examiner.*